(12) United States Patent
Oyagi et al.

(10) Patent No.: US 7,228,122 B2
(45) Date of Patent: Jun. 5, 2007

(54) CELLULAR PHONE UNIT, CONTROL SYSTEM OF VEHICLE-MOUNTED DEVICE, CONTROL METHOD OF CELLULAR PHONE UNIT, CONTROL METHOD OF VEHICLE-MOUNTED DEVICE, CONTROL PROGRAM OF CELLULAR PHONE UNIT, CONTROL PRGRAM OF VEHICLE-MOUNTED DEVICE, AND RECORDING MEDIUM RECORDING THE PROGRAM

(75) Inventors: Masayuki Oyagi, Kyoto (JP); Tanichi Ando, Kyoto (JP); Shinichi Shoji, Kyoto (JP); Akihiko Namakura, Kyoto (JP)

(73) Assignee: Omron Corporation, Kyoto-shi (JP)

( * ) Notice: Subject to any disclaimer, the term of this patent is extended or adjusted under 35 U.S.C. 154(b) by 130 days.

(21) Appl. No.: 10/486,081

(22) PCT Filed: Aug. 2, 2002

(86) PCT No.: PCT/JP02/07939

§ 371 (c)(1),
(2), (4) Date: Feb. 6, 2004

(87) PCT Pub. No.: WO03/015313

PCT Pub. Date: Feb. 20, 2003

(65) Prior Publication Data

US 2004/0242198 A1 Dec. 2, 2004

(30) Foreign Application Priority Data

Aug. 7, 2001 (JP) .............................. 2001-239869

(51) Int. Cl.
*H04Q 7/20* (2006.01)

(52) U.S. Cl. ...................... 455/411; 455/418; 455/419; 455/420

(58) Field of Classification Search ................ 455/411, 455/410, 418, 419, 420
See application file for complete search history.

(56) References Cited

U.S. PATENT DOCUMENTS 5,887,250 A * 3/1999 Shah .......................... 455/411

(Continued)

FOREIGN PATENT DOCUMENTS

DE 196 43 020 C1 3/1998

(Continued)

*Primary Examiner*—Erika A. Gary
(74) *Attorney, Agent, or Firm*—Foley & Lardner LLP

(57) ABSTRACT

A cellular phone unit (1) is provided with ID information input means for accepting an input of user ID information, ID judging means for judging whether or not the inputted user ID information is identical to pre-registered ID information, authentication information transmission permitting means for deciding whether or not to permit transmission of sender authentication information in accordance with the judgment result, and authentication information transmitting means for sending the sender authentication information in accordance with the decision. A vehicle-mounted control device (2) is provided with an antenna (5) and a transmission and reception section (6) for receiving the sender authentication information, and a control section (4) and an interface (7) for judging whether or not the sender authentication information received from the cellular phone unit (1) is identical to pre-registered authentication information and for controlling vehicle-mounted devices (3a) through (3c) in accordance with the judgment result.

16 Claims, 4 Drawing Sheets

U.S. PATENT DOCUMENTS

| | | |
|---|---|---|
| 6,219,793 B1 | 4/2001 | Li et al. |
| 6,587,040 B2 * | 7/2003 | Seto ........................ 340/426.1 |
| 6,873,824 B2 * | 3/2005 | Flick .......................... 455/41.2 |
| 2002/0138761 A1 * | 9/2002 | Kanemaki et al. .......... 713/201 |

FOREIGN PATENT DOCUMENTS

| | | |
|---|---|---|
| DE | 198 46 452 A1 | 12/1999 |
| EP | 0 913 979 A2 | 5/1999 |
| JP | 61-217866 | 9/1986 |
| JP | 01-114193 | 5/1989 |
| JP | 04-178058 | 6/1992 |
| JP | 10-028132 | 1/1998 |
| JP | 10-035417 | 2/1998 |
| JP | 11-198762 | 7/1999 |
| JP | 2000-220332 | 8/2000 |
| JP | 2001-152717 | 6/2001 |
| JP | 2001-193324 | 7/2001 |
| JP | 2002-240683 | 8/2002 |
| WO | WO 94/01963 A1 | 1/1994 |
| WO | WO 00/38119 A1 | 6/2000 |

* cited by examiner

CELLULAR PHONE UNIT, CONTROL SYSTEM OF VEHICLE-MOUNTED DEVICE, CONTROL METHOD OF CELLULAR PHONE UNIT, CONTROL METHOD OF VEHICLE-MOUNTED DEVICE, CONTROL PROGRAM OF CELLULAR PHONE UNIT, CONTROL PRGRAM OF VEHICLE-MOUNTED DEVICE, AND RECORDING MEDIUM RECORDING THE PROGRAM

TECHNICAL FIELD

The present invention relates to a control system and control method of a vehicle-mounted device using a cellular phone unit; and a cellular phone unit and a control method of a cellular phone unit used therein.

BACKGROUND ART

Conventionally, a remote control technique to lock/unlock the doors of a vehicle is widely used. A typical example is a keyless entry system. In this system, the doors are locked/unlocked if a vehicle-mounted control device receives weak radio wave that is sent from a dedicated remote controller. The dedicated remote controller sends the weak radio wave whose reachable distance is up to about 50 m to 100 m, in response to pressing of a button of the dedicated remote controller.

Further, as a developed type of the keyless entry system, a smart entry system (or passive entry system) is known. This system unlocks the doors by detecting the user approaching the vehicle, and locks the doors by detecting the user leaving the vehicle.

In these systems, a remote controller held by the user sends a predetermined ID code in response to the button operation or in response to a request signal sent from the vehicle. Then, the doors are unlocked, etc., if the vehicle-mounted control device can judge the ID code to be valid.

By using various types of entry systems as described above, the user can lock/unlock the doors without much risk that the key could be forged by the third party and without trouble of searching for the key-hole in the dark.

With the various types of conventional entry systems, however, if the remote controller, which is an equivalent of a conventional metal key, is lost or stolen, the third party who acquires or steals the remote controller may use the vehicle illegally.

Further, the user needs to carry around the remote controller for locking/unlocking the doors, in addition to a metal key to be required for starting the vehicle. Further, as vehicle-mounted devices to be controlled by remote controllers, such as an audio device and a navigation device, have been recently increased in vehicles, the handling of these controllers has become more and more complicated.

DISCLOSURE OF INVENTION

In order to solve the foregoing problems, the present invention has an objective to provide a control system and control method of a vehicle-mounted device, a cellular phone unit, and a control method of a cellular phone unit, which can realize high security and various device control.

In order to achieve the foregoing objective, a cellular phone unit of the present invention is arranged so as to include ID information input means for accepting an input of user ID information; ID judging means for judging whether or not the user ID information that is inputted through the ID information input means is identical to pre-registered ID information; authentication information transmission permitting means for deciding whether or not to permit transmission of sender authentication information to a vehicle-mounted control device which controls a vehicle-mounted device, in accordance with a judgment result of the ID judging means, the sender authentication information being used for allowing the vehicle-mounted control device to authorize the cellular phone unit; and authentication information transmitting means for sending the sender authentication information to the vehicle-mounted control device, in accordance with a decision of the authentication information transmission permitting means.

Further, a control system of a vehicle-mounted device of the present invention which includes the cellular phone unit as arranged above, and a vehicle-mounted control device for controlling the vehicle-mounted device in accordance with information sent from the cellular phone unit is so arranged that the vehicle-mounted control device includes authentication information receiving means for receiving the sender authentication information sent from the cellular phone unit; sender authenticating means for judging whether or not the sender authentication information that is received by the authentication information receiving means is identical to pre-registered authentication information; and device control means for controlling the vehicle-mounted device in accordance with a judgment result of the sender authenticating means.

In these arrangements, the cellular phone unit includes various types of cellular phone unit and PHS (Personal-Handyphone-System), as well as a PDA (Personal-Digital-Assistant) having the function of telephonic communication, and the like.

The user ID information is information for identifying the user of the cellular phone unit. The user ID information may be a personal identification code composed of a string consisting of characters such as numbers and symbols, and information representing the voiceprint, fingerprint, retina, or face image of the user, for example. Note that, for enhancing the security, it is preferable to regularly change/update the user ID information.

The vehicle-mounted device may be a device for controlling the setting operation of the vehicle, such as a door locking/unlocking device, an engine start control device (immobilizer), a steering lock device, and a power window opening and shutting device of the vehicle. Alternatively, the vehicle-mounted device may be a device optionally equipped in the vehicle, such as an air conditioner and an audio device.

With these arrangements, whether or not the cellular phone unit is operated by the valid user is checked in the operation of the ID information input means and ID judging means. As a result, if the operator of the cellular phone unit is judged to be the valid user, namely, the person who inputted the valid user ID information, the cellular phone unit sends the sender authentication information in accordance with the function of the authentication information transmission permitting means and authentication information transmitting means. Note that, the sender authentication information may be any form of information such as digital/analog data, provided that the sender authentication information is predefined as common information between the cellular phone unit and the vehicle-mounted control device for identifying the cellular phone unit which is the sender.

The sender authentication information thus sent from the cellular phone unit is received by the authentication information receiving means of the vehicle-mounted control device. Then, the sender authenticating means judges whether or not the received sender authentication information is identical to authentication information that is pre-registered in the vehicle-mounted control device. As a result, the vehicle-mounted control device judges whether or not the sender authentication information is sent from the valid sender that corresponds to the vehicle-mounted control device in question. Finally, the vehicle-mounted device is controlled in accordance with a result of the judgment.

Here, the device control means may control the vehicle-mounted device without being specially instructed by the cellular phone unit, if the vehicle-mounted device performs relatively simple operations, as in a door locking/unlocking device. The device control means may receive detailed control instructions from the cellular phone unit either together with or separately from the sender authentication information, if the vehicle-mounted device performs relatively complicated operations, as in an audio device.

Note that, the information transmission and reception may use wireless communication such as radio wave and infrared wireless communication, or may use data transmission and reception by directly connecting the cellular phone unit with the vehicle-mounted control device.

With this, the user can simply and variously control vehicle-mounted devices only by carrying around a cellular phone unit which is widely used. Further, even if the cellular phone is lost or stolen, it is possible to prevent the third party who acquires or steals the cellular phone unit from using the vehicle illegally.

Further, a control method of a cellular phone unit of the present invention is arranged so as to include (i) ID information input step of inputting user ID information; (ii) ID judging step of judging whether or not the inputted user ID information is identical to pre-registered ID information; (iii) transmission permitting step of deciding whether or not to permit transmission of sender authentication information to a vehicle-mounted control device which controls a vehicle-mounted device, in accordance with a judgment result in the step (ii), the sender authentication information being used for allowing the vehicle-mounted control device to authorize the cellular phone unit; and (iv) authentication information transmitting step of sending the sender authentication information to the vehicle-mounted control device, in accordance with a decision in the step (iii).

Further, a control method of a vehicle-mounted device of the present invention for controlling the vehicle-mounted device in accordance with information sent from a cellular phone unit is arranged so as to include the steps (i) through (iv) in the control method of a cellular phone unit as arranged above; (v) authentication information receiving step of receiving at a vehicle-mounted control device the sender authentication information sent from the cellular phone unit; (vi) sender authenticating step of judging whether or not the received sender authentication information is identical to authentication information that is pre-registered in the vehicle-mounted control device; and (vii) device controlling step of controlling the vehicle-mounted device in accordance with a judgment result in the step (vi).

With these methods, whether or not the cellular phone unit is operated by the valid user is checked in the steps (i) and (ii). As a result, if the operator of the cellular phone unit is judged to be the valid user, namely, the person who inputted the valid user ID information, the cellular phone unit sends the sender authentication information in the steps (iii) and (iv).

The sender authentication information thus sent from the cellular phone unit is received by the vehicle-mounted control device in the step (v). Then, the vehicle-mounted control device judges, in the step (vi), whether or not the received sender authentication information is identical to authentication information that is pre-registered in the vehicle-mounted control device. As a result, the vehicle-mounted control device judges whether or not the sender authentication information is sent from the valid sender that corresponds to the vehicle-mounted control device in question. Finally, the vehicle-mounted device is controlled in accordance with a result of the judgment in the step (vii).

In the step (vii), the vehicle-mounted control device may control the vehicle-mounted device without being specially instructed by the cellular phone unit, if the vehicle-mounted device performs relatively simple operations, as in a door locking/unlocking device. The vehicle-mounted control device may receive detailed control instructions from the cellular phone unit either together with or separately from the sender authentication information, if the vehicle-mounted device performs relatively complicated operations, as in an audio device.

With this, the user can simply and variously control vehicle-mounted devices only by carrying around a cellular phone unit which is widely used. Further, even if the cellular phone is lost or stolen, it is possible to prevent the third party who acquires or steals the cellular phone unit from using the vehicle illegally.

Note that, the control method of a cellular phone unit may be implemented by a computer as a control program of a cellular phone unit. Further, the control method of a vehicle-mounted device may be implemented by a computer as a control program of a vehicle-mounted device.

Further, with a computer-readable recording medium containing the control program of a cellular phone unit as arranged above or the control program of a vehicle-mounted device as arranged above, it is possible to cause a computer to implement the control method of a cellular phone unit or the control method of a vehicle-mounted device.

For a fuller understanding of the nature and advantages of the invention, reference should be made to the ensuing detailed description taken in conjunction with the accompanying drawings.

BEST MODE FOR CARRYING OUT THE INVENTION

The following will explain a control system of a vehicle-mounted device (hereinafter referred to as the "present control system") in accordance with an embodiment of the present invention, with reference to the drawings.

[1. System Configuration]

Figure 1:
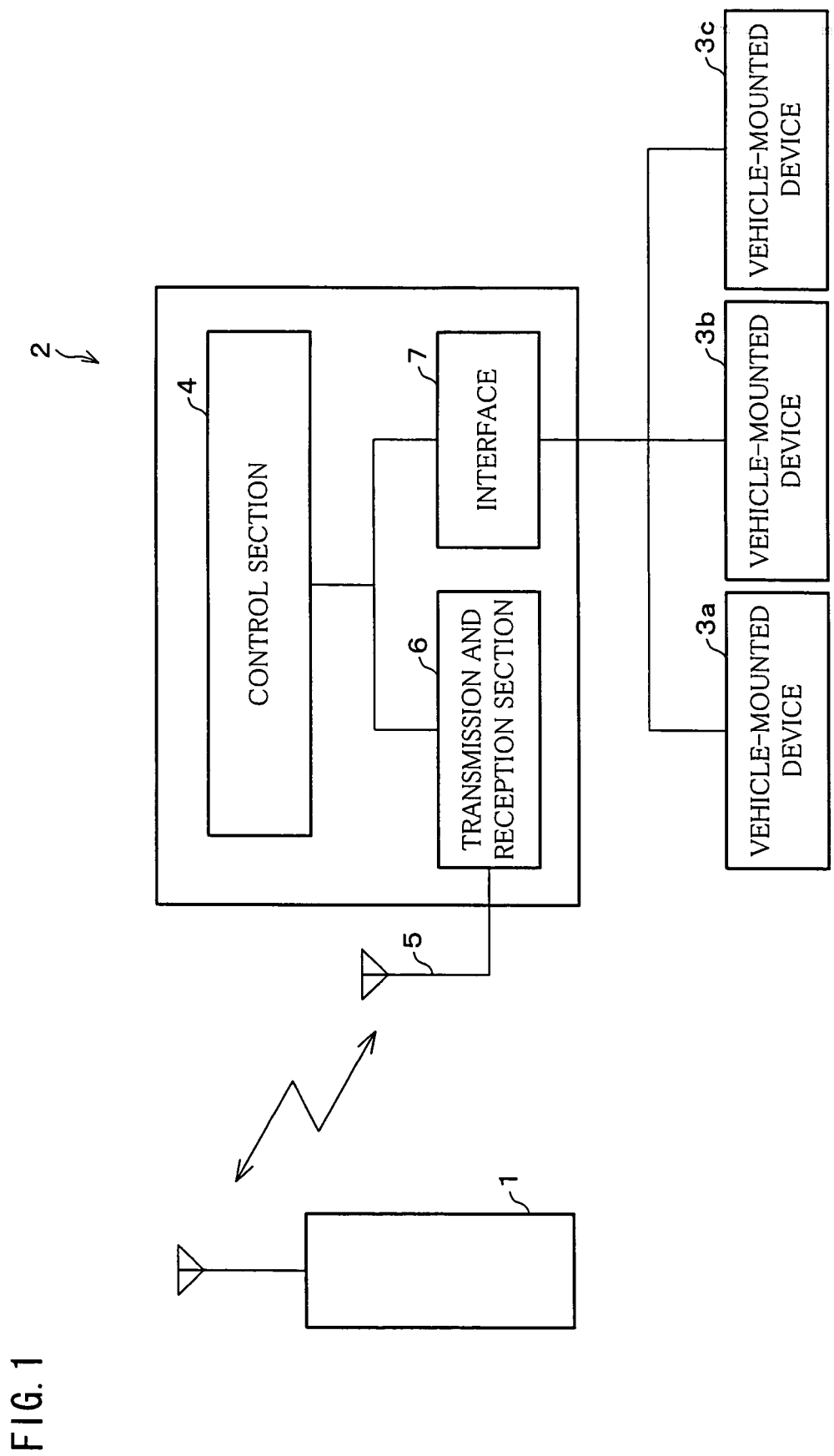
FIG. 1 is a block diagram schematically showing a control system of a vehicle-mounted device in accordance with an embodiment of the present invention.

FIG. 1 schematically shows an arrangement of the present control system. As shown in FIG. 1, the present control system is composed of a cellular phone unit 1, a vehicle-mounted control device 2, and vehicle-mounted devices 3a, 3b, and 3c.

The portable phone unit 1 is widely used among consumers. In addition to the function of telephone, the portable phone unit 1 offers a variety of services such as the orientation of the cellular phone unit 1 which is realized by GPS (Global Positioning System), etc., information service using various communication networks, music and game distribution service, and electronic commerce.

The vehicle-mounted control device 2 is a control device equipped in vehicles. The vehicle-mounted control device 2 is composed of a control section 4 (sender authenticating means), an antenna 5 (authentication information receiving means), a transmission and reception section 6 (authentication information receiving means), and an interface 7 (device control means). The interface 7 is connected to the plurality of vehicle-mounted devices 3a, 3b, and 3c.

In other words, the present control system of the vehicle-mounted device is provided with the cellular phone unit 1, and the vehicle-mounted control device 2 which controls the vehicle-mounted devices 3a, 3b, and 3c in response to information sent from the cellular phone unit 1. Note that, in the present specification, the vehicle may be any given form such as a passenger car, a truck, and a bus, but the following explanation assumes that the vehicle is a passenger car.

Next, the arrangements of the cellular phone unit 1 and the vehicle-mounted control device 2 will be explained in detail.

[2. Arrangement of the Cellular Phone Unit]

Figure 2:
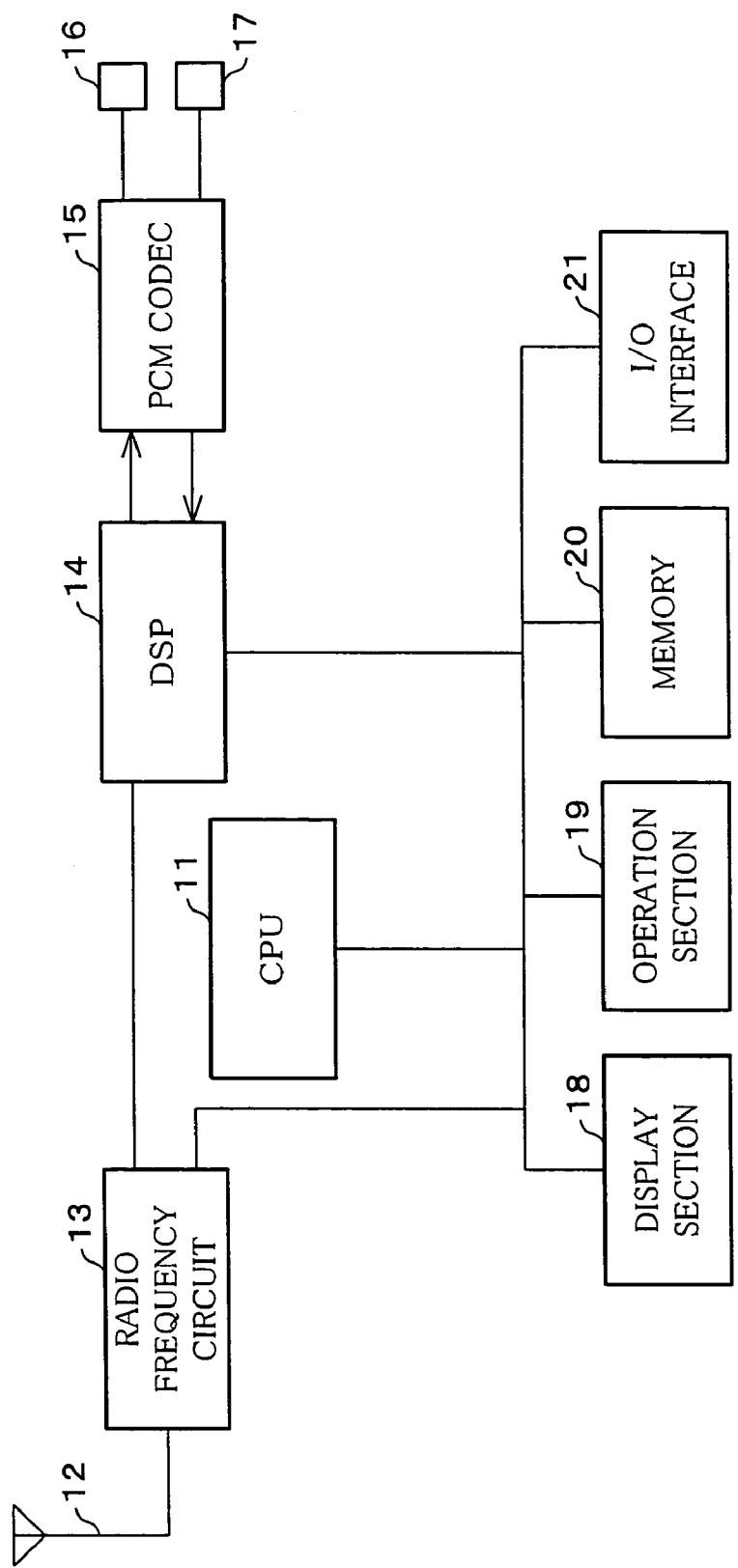
FIG. 2 is a block diagram schematically showing an arrangement of a cellular phone unit in the control system.

FIG. 2 is a block diagram schematically showing an arrangement of the cellular phone unit 1. As shown in FIG. 2, the cellular phone unit 1 is provided with a CPU (Central Processing Unit) 11 (ID judging means, authentication information transmission permitting means, authentication information transmitting means, device control means), an antenna 12 (authentication information transmitting means), a radio-frequency circuit 13 (authentication information transmitting means), a DSP (Digital Signal Processor) 14, a PCM (Pulse Code Modulation) codec 15, a speaker 16, a microphone 17, a display section 18, an operation section 19 (ID information input means), a memory 20, and an I/O interface 21.

The CPU 11 is composed of a microcomputer, for example. The CPU 11 uses its computational capability to collect and process information and to give instructions to control circuits. With this, the CPU 11 controls the total cellular phone unit 1.

The radio-frequency circuit 13 generates and controls radio wave by which the cellular phone unit 1 communicates with a base station and the vehicle-mounted control device 2. The radio-frequency circuit 13 typically generates radio wave having a frequency of 800 MHz (megahertz) or 1.5 GHz (gigahertz). Using the radio wave, the cellular phone unit 1 can communicate with a base station that is located at a distance of several tens kilometer. The antenna 12 is a metal antenna used to generate the radio wave.

The DSP 14 is a digital signal processor, which performs various types of digital signal processing under the control of the CPU 11.

The PCM codec 15 is a circuit which carries out coding for converting an analog signal into a digital signal and decoding for converting a digital signal into an analog signal. The PCM codec 15 converts an audio signal (analog signal) detected at the microphone 17 into a digital signal so as to transmit the digital signal to the DSP 14, and converts a digital signal transmitted from the DSP 14 into an audio signal so as to output the audio signal to the speaker 16.

The speaker 16 outputs as an actual sound an electrical audio signal that is outputted from the PCM codec 15. The user can recognize the audio output of the cellular phone unit 1 through the speaker 16.

The microphone 17 detects a sound, such as a voice of the user, as an electrical audio signal. By speaking toward the microphone 17, the user can carry out telephonic communication using the cellular phone unit 1.

The display section 18 is composed of a dot matrix type LCD (Liquid Crystal Display). The display section 18 may be any device such as an LED (Light Emitting Diode) display, provided that the device can display information to the user.

The operation section 19 is a user interface, and is composed of a keyboard including a numerical keypad and arrow keys, etc. The operation section 19 may be a pointing device, and the like.

The memory 20 is configured with a semiconductor memory such as a RAM (Random Access Memory) and ROM (Read Only Memory), and an information recording device which uses a recording medium such as a magnetic disk drive and an optical disk drive. The memory 20 stores a variety of information under the control of the CPU 11. The memory 20 stores a program which enable the CPU 11 to perform control and computation, and data.

The I/O interface 21 is an interface circuit which is controlled by the CPU 11 so as to perform data communication with an external device. As described later, the I/O interface 21 is provided with a connector and interface circuit for connecting to the vehicle-mounted control device 2.

Note that, the cellular phone unit 1 of the present embodiment includes various types of cellular phone unit and PHS as arranged above, as well as a PDA having the function of telephonic communication, and the like.

[3. Arrangement of the Vehicle-Mounted Control Device]

The vehicle-mounted control device 2 is a control device equipped in vehicles. As shown in FIG. 1, he vehicle-mounted control device 2 is composed of the control section 4, the antenna 5, the transmission and reception section 6, and the interface 7. Further, the vehicle-mounted control device 2 is connected to the plurality of vehicle-mounted devices 3a, 3b, and 3c via the interface 7.

The control section 4 is composed of a microcomputer, for example. The control section 4 uses its computational capability to collect and process information and to give instructions to control circuits. With this, the control section 4 controls the total vehicle-mounted control device 2.

The transmission and reception section 6 is a transmission and reception circuit for sending and receiving radio wave that is sent from the cellular phone unit 1. The antenna 5 is a metal antenna used for the transmission and reception.

The interface 7 is a connection interface for connecting the vehicle-mounted control device 2 to the vehicle-mounted devices 3a, 3b, and 3c. The interface 7 is mainly composed of a connector terminal and an interface circuit.

The vehicle-mounted devices 3a, 3b, and 3c are devices mounted on a vehicle. The vehicle-mounted devices 3a, 3b, and 3c may be a device for controlling the setting operation of the vehicle, such as a door locking/unlocking device, an engine start control device (immobilizer), a steering lock device, and a power window opening and shutting device of the vehicle. Alternatively, the vehicle-mounted devices 3a, 3b, and 3c may be a device optionally equipped in the vehicle, such as an air conditioner and an audio device. Of course, any number of vehicle-mounted devices 3a, 3b, and 3c can be connected to the vehicle-mounted control device 2.

The vehicle-mounted devices 3a, 3b, and 3c which should be operated by the user before driving the vehicle and which are preferably controlled by the present control system may be a door locking/unlocking device, an engine start control device, a steering lock device, a power window opening and shutting device, and a driving environment control device, for example, of the vehicle. Here, the driving environment control device is a control device for adjusting user-configured environments such as the seat position, mirror position, and handle tilt position.

[4. Operation Example of the Present Control System]

Figure 3:
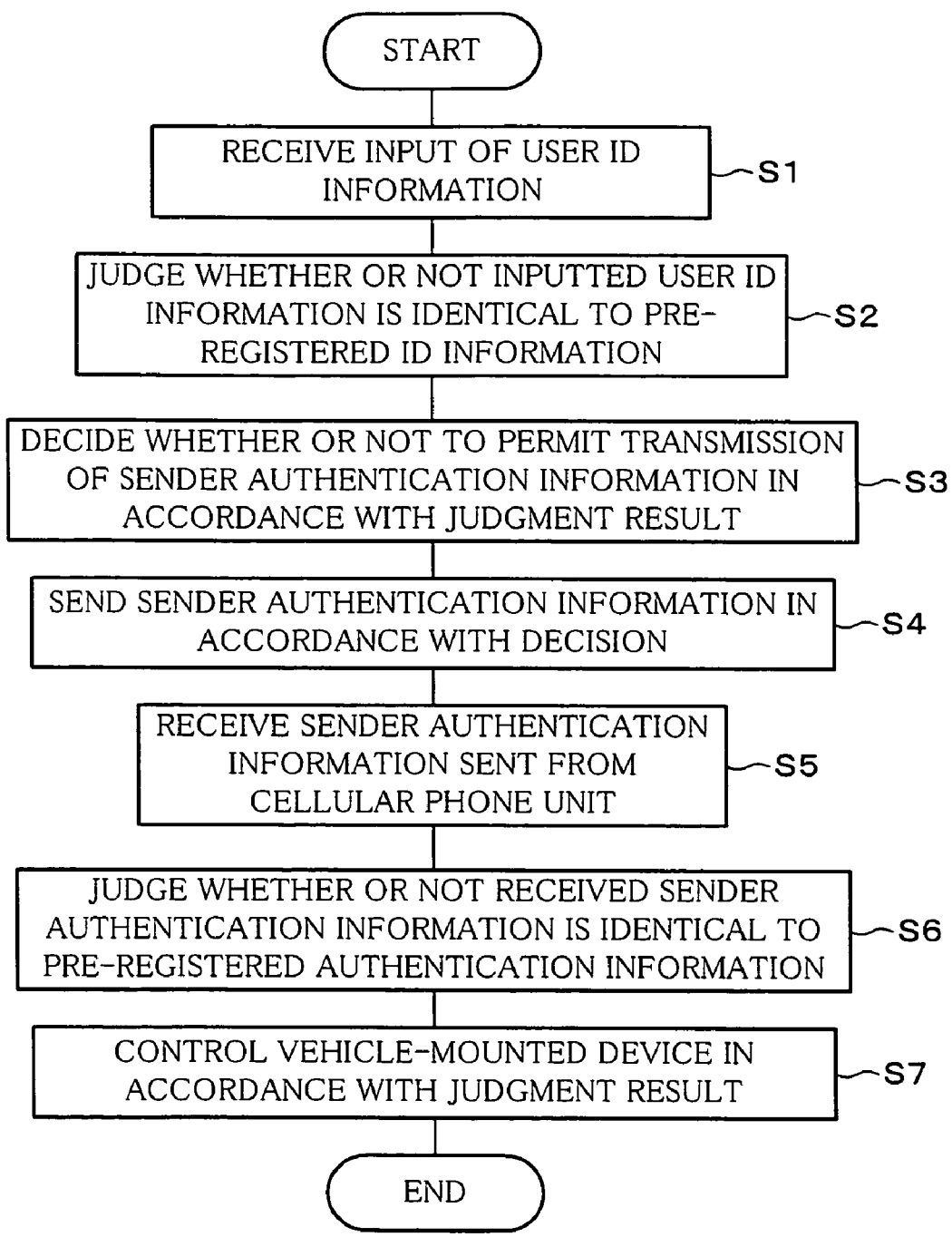
FIG. 3 is a flow chart showing an operation example of the control system.

Next, an operation example of the present control system will be explained with reference to FIG. 3. As shown in FIG. 3, the operation example of the present control system is composed of steps S1 through S7. The steps S1 through S4 are mainly carried out by the cellular phone unit 1. The steps S5 through S7 are mainly carried out by the vehicle-mounted control device 2.

First, the cellular phone unit 1 (see FIG. 2) accepts an input of user ID information (S1). Here, the user ID information is information for identifying the user of the cellular phone unit 1. The user ID information is, for example, a personal identification code composed of a string consisting of characters such as numbers and symbols (string consisting of eight consecutive alphanumeric characters, for example). The user inputs the user ID information through the operation section 19 of the cellular phone unit 1. Alternatively, the user ID information may be information representing the voiceprint, fingerprint, retina, or face image of the user, for example. In these cases, the user should input the information to the cellular phone unit 1 in advance via the microphone 17 and a camera section (not shown). Note that, for enhancing the security, it is preferable to regularly change/update the user ID information.

In the next step, the CPU 11 (see FIG. 2) of the cellular phone unit 1 judges whether or not the user ID information inputted in S1 is identical to pre-registered user ID information (S2). In the above-mentioned example, a valid personal identification code composed of the string consisting of eight consecutive alphanumerical characters has been already registered in the memory 20 (see FIG. 2), etc., of the cellular phone unit 1. Thus, the CPU 11 judges whether or not the registered personal identification code is identical to the personal identification code inputted in S1. With this judgment, the CPU 11 checks if the cellular phone unit 1 is operated by the valid user. In the case where the user ID information is information representing the voiceprint, fingerprint, retina, or face image of the user, the information is inputted in S11, and, in the present step, compared with pre-registered sound data or image data.

In the next step, the CPU 11 of the cellular phone unit 1 decides whether or not to permit the transmission of sender authentication information (S3), in accordance with a result of the judgment in S2 as to whether the user ID information inputted in S1 is identical to the pre-registered user ID information. More specifically, the CPU 11 permits the transmission of the sender authentication information if the user ID information inputted in S1 is identical to the pre-registered user ID information. On the other hand, the CPU 11 does not permit the transmission of the sender authentication information if the user ID information inputted in S1 is not identical to the pre-registered user ID information.

The sender authentication information may be any form of information such as digital/analog data, provided that the sender authentication information is predefined as common information between the cellular phone unit 1 and the vehicle-mounted control device 2 for identifying the cellular phone unit 1 which is the sender. An example of the sender authentication information is a sender telephone number uniquely assigned to each cellular phone unit 1.

In the next step, the CPU 11 of the cellular phone unit 1 sends the sender authentication information (S4) in accordance with a decision in S3 as to whether or not to permit the transmission of the sender authentication information. More specifically, if the transmission of the sender authentication information is permitted in S3, the CPU 11 externally sends the sender authentication information via the radio-frequency circuit 13 and the antenna 12.

Note that, it is preferable in the step S4 that the CPU 11 of the cellular phone unit 1 sends the sender authentication information after judging whether or not the CPU 11 has received a request signal from the vehicle-mounted control device 2. This will be described later in [5. Other Operation Examples].

In the next step, the control section 4 (see FIG. 1) of the vehicle-mounted control device 2 receives the sender authentication information sent from the cellular phone unit 1 (S5). Namely, the vehicle-mounted control device 2 receives the radio-frequency signal sent from the cellular phone unit 1 via the antenna 5 and the transmission and reception section 6, and decodes the radio-frequency signal into the sender authentication information. A result of the decoding is then properly stored in the control section 4.

In the next step, the control section 4 of the vehicle-mounted control device 2 judges whether or not the sender authentication information received in S5 is identical to pre-registered authentication information (S6). For example, the control section 4 judges whether or not the sender telephone number sent from the cellular phone unit 1 is identical to the pre-registered telephone number (sender telephone number of the valid user). With this, the control section 4 of the vehicle-mounted control device 2 can judge whether or not the sender sending the sender authentication information is the valid sender that corresponds to the vehicle-mounted control device 2 in question.

In the last step, the control section 4 of the vehicle-mounted control device 2 controls the vehicle-mounted devices 3a, 3b, and 3c (S7) in accordance with a result of the judgment in S6. Here, the control section 4 of the vehicle-mounted control device 2 may control the vehicle-mounted devices 3a, 3b, and 3c without being specially instructed by the cellular phone unit 1, if the vehicle-mounted devices 3a, 3b, and 3c perform relatively simple operations, as in a door locking/unlocking device. The control section 4 of the vehicle-mounted control device 2 may receive detailed control instructions from the cellular phone unit 1 either together with or separately from the sender authentication information, if the vehicle-mounted devices 3a, 3b, and 3c perform relatively complicated operations, as in an audio device.

With these operations, the present control system can simply and variously control the vehicle-mounted devices 3a, 3b, and 3c. For example, the user can lock/unlock the doors of the vehicle or activates the air conditioner in the vehicle by remotely controlling the vehicle-mounted devices 3a, 3b, and 3c using the cellular phone unit 1 habitually carried by the user.

Further, in the present control system, the vehicle-mounted devices 3a, 3b, and 3c are not controlled unless the user ID information is inputted. Thus, if the cellular phone unit 1 which is an instruction terminal is lost or stolen, the third party who acquires or steals the cellular phone unit 1 cannot use the vehicle illegally.

Note that, the operation to be performed by the vehicle-mounted devices 3a, 3b, and 3c under the control of the control section 4 of the vehicle-mounted control device 2 is not limited. The vehicle-mounted devices 3a, 3b, and 3c may perform an operation of connecting to an external network such as the Internet and a server. Alternatively, control instructions may be sent in reverse direction, namely, from the vehicle-mounted devices 3a, 3b, and 3c to the control section 4, then from the control section 4 to the cellular phone unit 1. For example, the vehicle-mounted devices 3a, 3b, and 3c and the vehicle-mounted control device 2 may send control signals to the cellular phone unit 1. With this, the vehicle-mounted control device 2 can realize external communication using the function of telephonic communication inherently provided to the cellular phone unit 1.

If these operations are realized, the vehicle-mounted control device 2 serves as a gateway for external data communication. For example, the vehicle-mounted control device 2 can externally send image data and sound data of the inside of the vehicle, if a vehicle-mounted camera (in a 360-degree shooting system, for example) is used as the vehicle-mounted devices 3a, 3b, and 3c. Alternatively, the vehicle-mounted control device 2 can receive a control instruction from an external center via the cellular phone unit 1 so as to control the vehicle-mounted devices 3a, 3b, and 3c.

The foregoing explained a case where a cellular phone communication network is used in the transmission and reception of information between the cellular phone unit 1 and the vehicle-mounted control device 2, but the form of the information transmission and reception is not limited to this. The information transmission and reception may use wireless communication such as radio wave and infrared wireless communication, or may use data transmission and reception by directly connecting the cellular phone unit 1 with the vehicle-mounted control device 2.

If the data transmission and reception by the direct connection is used for transmitting and receiving information between the cellular phone unit 1 and the vehicle-mounted control device 2, it is preferable that the vehicle-mounted control device 2 is provided with a cellular phone storing section. The cellular phone storing section stores the cellular phone unit 1 so as to electrically connect the cellular phone unit 1 with the vehicle-mounted control device 2. A concrete example of the cellular phone unit storing section is a storing section having a cradle/pocket shape which can stably place the cellular phone unit 1 and which has a connector terminal fittingly connecting to the I/O interface 21 (see FIG. 2, external connector) of the cellular phone unit 1.

With this arrangement, when the cellular phone unit 1 is stored in the cellular phone unit storing section, the cellular phone unit 1 and the vehicle-mounted control device 2 are electrically connected with each other so as to be able to communicate with each other. Of course, it is also preferable that through the cellular phone unit storing section the vehicle-mounted control device supplies electric power to the cellular phone unit 1, and receives data stored in the cellular phone unit 1 so as to back up the data, or the like.

If the data transmission and reception by the direct connection is used for transmitting and receiving information between the cellular phone unit 1 and the vehicle-mounted control device 2, special communication means for mutual communication (such as short-distance wireless means) needs not be provided to either the cellular phone unit 1 or vehicle-mounted control device 2.

The feature of the present control system is expressed as follows, using the arrangement of the cellular phone unit 1. The cellular phone unit 1 is arranged so as to include ID information input means for accepting an input of user ID information; ID judging means for judging whether or not the user ID information that is inputted through the ID information input means is identical to pre-registered ID information; authentication information transmission permitting means for deciding whether or not to permit transmission of sender authentication information in accordance with a judgment result of the ID judging means; and authentication information transmitting means for sending the sender authentication information to the vehicle-mounted control device 2 which controls the vehicle-mounted devices 3a, 3b, and 3c, in accordance with a decision of the authentication information transmission permitting means, the sender authentication information being used for allowing the vehicle-mounted control device 2 to authorize the cellular phone unit 1.

Further, the operation of the present control system is expressed as follows, using the control method of the vehicle-mounted device. The control method of the vehicle-mounted device is arranged so as to include (i) ID information input step of inputting user ID information to the cellular phone unit 1; (ii) ID judging step of judging whether or not the inputted user ID information is identical to ID information that is pre-registered in the cellular phone unit 1; (iii) transmission permitting step of deciding whether or not to send sender authentication information, in accordance with a judgment result in the step (ii); (iv) authentication information transmitting step of sending the sender authentication information in accordance with a decision in the step (iii); (v) authentication information receiving step of receiving the sender authentication information at the vehicle-mounted control device 2; (vi) sender authenticating step of judging whether or not the received sender authentication information is identical to authentication information that is pre-registered in the vehicle-mounted control device 2; and (vii) device controlling step of controlling the vehicle-mounted devices 3a, 3b, and 3c in accordance with a judgment result in the step (vi).

[5. Other Operation Examples]

As explained in S4 in the foregoing operation example (see FIG. 3), it is preferable that the CPU 11 (see FIG. 2) of the cellular phone unit 1 not only decides whether or not to permit the transmission of the sender authentication information in S3 (see FIG. 3), but also judges whether or not the CPU 11 has received a request signal from the vehicle-mounted control device 2 (see FIG. 1), before sending the sender authentication information.

Figure 4:
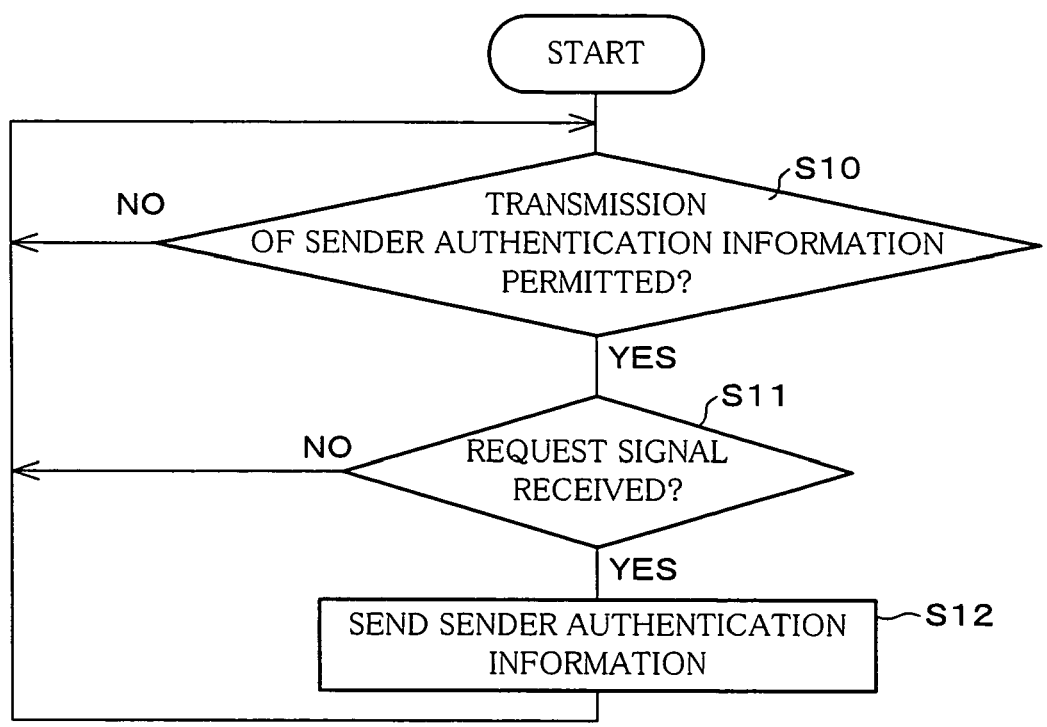
FIG. 4 is a flow chart showing an operation of the control system in a case where the control system also judges whether or not a request signal has been received from a vehicle-mounted control device.

FIG. 4 is a flow chart showing an operation example of the present control system in a case where the present control system also judges whether or not a request signal has been received from the vehicle-mounted control device 2. As shown in FIG. 4, the present operation example is composed of steps S10 through S12, which are to be added to the step S4.

First, the CPU 11 of the cellular phone unit 1 judges whether or not to permit the transmission of the sender authentication information (S11). If the transmission of the sender authentication information is permitted, the CPU 11 further judges whether or not the CPU 11 has received a request signal from the vehicle-mounted control device 2 (S11). If the results of the judgment S10 and S11 are negative (NO), the CPU 11 of the cellular phone unit 1 repeats the steps from S10.

Only if the CPU 11 judges in S11 that the CPU 11 has received a request signal from the vehicle-mounted control device 2, the cellular phone unit 1 sends the sender authentication information (S12).

With this arrangement, the CPU 11 of the cellular phone unit 1 sends the sender authentication information in response to a request signal sent from the vehicle-mounted control device 2. This enables the sender authentication information to be sent at timing convenient to the vehicle-mounted control device 2. For example, it is assumed that the user approaches the vehicle in a condition where the CPU 11 has permitted the transmission of the sender authentication information. Here, the sender authentication information is automatically sent to the vehicle-mounted control device 2 when the cellular phone unit 1 detects a request signal sent from the vehicle-mounted control device 2, for example. With such automatic transmission, it is possible to automatically activate the door locking/unlocking device, the air conditioner, and the like.

As described above, a cellular phone unit of the present invention is arranged so as to include ID information input means for accepting an input of user ID information; ID judging means for judging whether or not the user ID information that is inputted through the ID information input means is identical to pre-registered ID information; authentication information transmission permitting means for deciding whether or not to permit transmission of sender authentication information to a vehicle-mounted control device which controls a vehicle-mounted device, in accordance with a judgment result of the ID judging means, the sender authentication information being used for allowing the vehicle-mounted control device to authorize the cellular phone unit; and authentication information transmitting means for sending the sender authentication information to the vehicle-mounted control device, in accordance with a decision of the authentication information transmission permitting means.

Therefore, if the cellular phone unit judges that the cellular phone unit is operated by the valid user, the cellular phone unit sends the sender authentication information. Then, after the vehicle-mounted control device judges whether or not the sender authentication information is sent from the valid sender that corresponds to the vehicle-mounted control device in question, the vehicle-mounted control device controls the vehicle-mounted device in accordance with the judgment result.

With this, the user can simply and variously control vehicle-mounted devices only by carrying around a cellular phone unit which is widely used. Further, even if the cellular phone is lost or stolen, it is possible to prevent the third party who acquires or steals the cellular phone unit from using the vehicle illegally.

Alternatively, the cellular phone unit of the present invention is so arranged that the authentication information transmission permitting means further decides whether or not to permit the transmission of the sender authentication information to the vehicle-mounted control device, in accordance with a request signal sent from the vehicle-mounted control device.

With this arrangement, the authentication information transmission permitting means sends the sender authentication information in response to a request signal sent from the vehicle-mounted control device. This enables the cellular phone unit to send the sender authentication information at timing convenient to the vehicle-mounted control device. For example, it is assumed that the user approaches the vehicle in a condition where the authentication information transmission permitting means has permitted the transmission of the sender authentication information. Here, the sender authentication information is automatically sent to the vehicle-mounted control device when the cellular phone unit detects a request signal sent from the vehicle-mounted control device, for example. With such automatic transmission, it is possible to automatically activate the door locking/unlocking device, the air conditioner, and the like.

With this, in addition to the foregoing effect, it is possible to authenticate the sender and subsequently control the devices without consciously operated by the user. Further, the cellular phone unit can resend the sender authentication information in response to a request of the vehicle-mounted control device. With this, it is possible to accurately authenticate the sender even if trouble occurs in the transmission and reception of the sender authentication information.

As described above, a control system of a vehicle-mounted device of the present invention which includes the cellular phone unit as arranged above, and a vehicle-mounted control device for controlling the vehicle-mounted device in accordance with information sent from the cellular phone unit is so arranged that the vehicle-mounted control device includes authentication information receiving means for receiving the sender authentication information sent from the cellular phone unit; sender authenticating means for judging whether or not the sender authentication information that is received by the authentication information receiving means is identical to pre-registered authentication information; and device control means for controlling the vehicle-mounted device in accordance with a judgment result of the sender authenticating means.

Therefore, if the cellular phone unit judges that the cellular phone unit is operated by the valid user, the cellular phone unit sends the sender authentication information. Then, after the vehicle-mounted control device judges whether or not the sender authentication information is sent from the valid sender that corresponds to the vehicle-mounted control device in question, the vehicle-mounted control device controls the vehicle-mounted device in accordance with the judgment result.

With this, the user can simply and variously control vehicle-mounted devices only by carrying around a cellular phone unit which is widely used. Further, even if the cellular phone is lost or stolen, it is possible to prevent the third party who acquires or steals the cellular phone unit from using the vehicle illegally.

Alternatively, the control system of a vehicle-mounted device of the present invention is so arranged that the vehicle-mounted control device further includes a cellular phone unit storing section for storing the cellular phone unit so as to electrically connect the cellular phone unit with the vehicle-mounted control device.

The shape, etc., of the cellular phone unit storing section is not limited here. A preferable example is the cellular phone unit storing section having a cradle/pocket shape which can stably place the cellular phone unit and which has a connector terminal fittingly connecting to the external connector of the cellular phone unit.

With this arrangement, when the cellular phone unit is stored in the cellular phone unit storing section, the cellular phone unit and the vehicle-mounted control device are electrically connected with each other so as to be able to communicate with each other. With this, the cellular phone unit can send the sender authentication information and other control information to the vehicle-mounted control device via the cellular phone unit storing means. Alternatively, the vehicle-mounted control device may send control signals to the cellular phone unit, thereby realizing external communication using the function of telephonic communication inherently provided to the cellular phone unit.

With this, in addition to the foregoing effect, the user can send and receive the sender authentication information and vehicle device information only by storing the cellular phone unit in the cellular phone unit storing section. Further, as the cellular phone unit and the vehicle-mounted control device are directly connected with each other for communication, special communication means for mutual communication (such as short-distance wireless means) needs not be provided to either the cellular phone unit or the vehicle-mounted control device.

Alternatively, the control system of a vehicle-mounted device of the present invention is so arranged that the vehicle-mounted device includes either a vehicle door locking and unlocking device, an engine start control device, a steering lock device, a power window opening and shutting device, or a driving environment control device.

Here, the driving environment control device is a control device for adjusting user-configured environments such as the seat position, mirror position, and handle tilt position.

With this arrangement, in addition to the foregoing effect, the user can easily control the vehicle-mounted devices to be controlled before driving the vehicle.

As described above, a control method of a cellular phone unit of the present invention is arranged so as to include (i) ID information input step of inputting user ID information; (ii) ID judging step of judging whether or not the inputted user ID information is identical to pre-registered ID information; (iii) transmission permitting step of deciding whether or not to permit transmission of sender authentication information to a vehicle-mounted control device which controls a vehicle-mounted device, in accordance with a judgment result in the step (ii), the sender authentication information being used for allowing the vehicle-mounted control device to authorize the cellular phone unit; and (iv) authentication information transmitting step of sending the sender authentication information to the vehicle-mounted control device, in accordance with a decision in the step (iii).

Therefore, if the operator of the cellular phone unit is judged to be the valid user in the steps (i) and (ii), the cellular phone unit sends the sender authentication information. Then, after the vehicle-mounted control device judges whether or not the sender authentication information is sent from the valid sender that corresponds to the vehicle-mounted control device in question, the vehicle-mounted control device controls the vehicle-mounted device in accordance with the judgment result.

With this, the user can simply and variously control vehicle-mounted devices only by carrying around a cellular phone unit which is widely used. Further, even if the cellular phone is lost or stolen, it is possible to prevent the third party who acquires or steals the cellular phone unit from using the vehicle illegally.

Alternatively, the control method of a cellular phone unit of the present invention is so arranged that, in the step (iii), whether or not to permit the transmission of the sender authentication information to the vehicle-mounted control device is further decided in accordance with a request signal sent from the vehicle-mounted control device.

Therefore, in the step (iii), the sender authentication information is sent in response to a request signal sent from the vehicle-mounted control device. This enables the sender authentication information to be sent at timing convenient to the vehicle-mounted control device.

With this, in addition to the foregoing effect, it is possible to authenticate the sender and subsequently control the devices without consciously operated by the user. Further, the cellular phone unit can resend the sender authentication information in response to a request of the vehicle-mounted control device. With this, it is possible to accurately authenticate the sender even if trouble occurs in the transmission and reception of the sender authentication information.

Further, a control method of a vehicle-mounted device of the present invention for controlling the vehicle-mounted device in accordance with information sent from a cellular phone unit is arranged so as to include the steps (i) through (iv) in the control method of a cellular phone unit as arranged above; (v) authentication information receiving step of receiving at a vehicle-mounted control device the sender authentication information sent from the cellular phone unit; (vi) sender authenticating step of judging whether or not the received sender authentication information is identical to authentication information that is pre-registered in the vehicle-mounted control device; and (vii) device controlling step of controlling the vehicle-mounted device in accordance with a judgment result in the step (vi).

Therefore, if the operator of the cellular phone unit is judged to be the valid user, the cellular phone unit sends the sender authentication information. Then, after receiving the sender authentication information in the step (v), the vehicle-mounted control device judges, in the step (vi), whether or not the received sender authentication information is identical to authentication information that is pre-registered in the vehicle-mounted control device. As a result of the judgment, if the sender authentication information is sent from the valid sender that corresponds to the vehicle-mounted control device in question, the vehicle-mounted control device controls the vehicle-mounted device.

With this, the user can simply and variously control vehicle-mounted devices only by carrying around a cellular phone unit which is widely used. Further, even if the cellular phone is lost or stolen, it is possible to prevent the third party who acquires or steals the cellular phone unit from using the vehicle illegally.

Note that, the control method of a cellular phone unit may be implemented by a computer as a control program of a cellular phone unit. Likewise, the control method of a vehicle-mounted device may be implemented by a computer as a control program of a vehicle-mounted device.

Further, with a computer-readable recording medium containing the control program of a cellular phone unit as arranged above or the control program of a vehicle-mounted device as arranged above, it is possible to cause a computer to implement the control method of a cellular phone unit or the control method of a vehicle-mounted device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention provides a control system and control method of a vehicle-mounted device; a cellular phone unit and a control method of a cellular phone unit used in the control system and control method of a vehicle-mounted device; a control program of a vehicle-mounted device; a control program of a cellular phone unit; and a recording medium recording the program. With this, the user can simply and variously control vehicle-mounted devices only by carrying around a cellular phone unit which is widely used. Further, even if the cellular phone is lost or stolen, it is possible to prevent the third party who acquires or steals the cellular phone unit from using the vehicle illegally.

This realizes high security and various device control.

The invention claimed is:

1. A portable instruction terminal, comprising:
   ID information input means for accepting an input of user ID information;
   ID judging means for judging whether or not said user ID information that is inputted through said ID information input means is identical to pre-registered ID information which has been already registered in the portable instruction terminal;
   authentication information transmission permitting means for permitting transmission of sender authentication information to a control device which controls a control target device, if said ID judging means judges that said user ID information is identical to the pre-registered ID information, said sender authentication information being used for allowing said control device to authorize said portable instruction terminal, wherein said authentication information transmission permitting means further decides whether or not to permit the transmission of said sender authentication information to said control device, in accordance with a request signal sent from said control device; and
   authentication information transmitting means for sending said sender authentication information to said control device, if said authentication information transmission permitting means permits the transmission of said sender authentication information,
   wherein the control device is a vehicle-mounted control device for controlling a vehicle-mounted device as the control target device.

2. The portable instruction terminal as set forth in claim 1, wherein:
   said authentication information transmitting means sends a control instruction either together with or separately from said sender authentication information.

3. The portable instruction terminal as set forth in claim 2, wherein:
   said portable instruction terminal receives the control instruction from an external device, using a function of telephonic communication.

4. The portable instruction terminal as set forth in claim 1, wherein:
   said portable instruction terminal performs external communication in accordance with a control signal received from said control target device or said control device, using a function of telephonic communication.

5. The portable instruction terminal as set forth in claim 1, wherein:
   said portable instruction terminal is a cellular phone unit.

6. The portable instruction terminal as set forth in claim 1, wherein:
   the portable instruction terminal receives control instructions from said control target device or said control device.

7. A control system of a control target device which includes a portable instruction terminal, and a control device for controlling said control target device in accordance with information sent from said portable instruction terminal, wherein:
   said portable instruction terminal includes:
   ID information input means for accepting an input of user ID information;
   ID judging means for judging whether or not said user ID information that is inputted through said ID information input means is identical to pre-registered ID information which has been already registered in the portable instruction terminal;
   authentication information transmission permitting means for permitting transmission of sender authentication information to said control device which controls said control target device, if said ID judging means judges that said user ID information is identical to the pre-registered ID information, said sender authentication information being used for allowing said control device to authorize said portable instruction terminal, wherein said authentication information transmission permitting means further decides whether or not to permit the transmission of said sender authentication information to said control device, in accordance with a request signal sent from said control device; and
   authentication information transmitting means for sending said sender authentication information to said control device, if said authentication information transmission permitting means permits the transmission of said sender authentication information, and
   said control device includes:
   authentication information receiving means for receiving said sender authentication information sent from said portable instruction terminal;
   sender authenticating means for judging whether or not said sender authentication information that is received by said authentication information receiving means is identical to pre-registered authentication information; and
   device control means for controlling said control target device in accordance with a judgment result of said sender authenticating means,
   wherein the control device is a vehicle-mounted control device for controlling a vehicle-mounted device as the control target device.

8. The control system of a control target device as set forth in claim 7, wherein said control device further includes:
   a storing section for storing said portable instruction terminal so as to electrically connect said portable instruction terminal with said control device.

9. The control system of a control target device as set forth in claim 7, wherein:
   said control target device includes either a vehicle door locking and unlocking device, an engine start control device, a steering lock device, a power window opening and shutting device, or a driving environment control device.

10. The control system as set forth in claim 7, wherein: said control device receives control instructions from said portable instruction terminal.

11. The control system as set forth in claim 7, wherein: said control device receives control instructions from said control target device.

12. The control system as set forth in claim 7, wherein: said control device controls said control target device that includes means for performing an operation of connecting to an external network.

13. A control method of a portable instruction terminal, comprising:
   (i) ID information input step of inputting user ID information;
   (ii) ID judging step of judging whether or not said input user ID information is identical to pre-registered ID information which has been already registered in the portable instruction terminal;
   (iii) transmission permitting step of permitting transmission of sender authentication information to a control device which controls a control target device, if said user ID information is judged to be identical to the pre-registered ID information in said step (ii), said sender authentication information being used for allowing said control device to authorize said portable instruction terminal, wherein whether or not to permit the transmission of said sender authentication information to said control device is further decided in accordance with a request signal sent from said control device; and
   (iv) authentication information transmitting step of sending said sender authentication information to said control device, if the transmission of said sender authentication information is permitted in said step (iii),
   wherein the control device is a vehicle-mounted control device for controlling a vehicle-mounted device as the control target device.

14. A control method of a control target device in which a control device controls said control target device in accordance with information sent from a portable instruction terminal, comprising:
   (i) ID information input step of inputting user ID information to said portable instruction terminal;
   (ii) ID judging step of judging by said portable instruction terminal whether or not said input user ID information is identical to pre-registered ID information which has been already registered in the portable instruction terminal;
   (iii) transmission permitting step of permitting said portable instruction terminal to send sender authentication information to said control device which controls said control target device, if said user ID information is judged to be identical to the pre-registered ID information in said step (ii), said sender authentication information being used for allowing said control device to authorize said portable instruction terminal, wherein whether or not to permit the transmission of said sender authentication information to said control device is further decided in accordance with a request signal sent from said control device;
   (iv) authentication information transmitting step of transmitting said sender authentication information from said portable instruction terminal to said control device, if the transmission of said sender authentication information is permitted in said step (iii);
   (v) authentication information receiving step of receiving at said control device said sender authentication information sent from said portable instruction terminal;
   (vi) sender authenticating step of judging whether or not said received sender authentication information is identical to authentication information that is pre-registered in said control device; and
   (vii) device controlling step of controlling said control target device in accordance with a judgment result in said step (vi),
   wherein the control device is a vehicle-mounted control device for controlling a vehicle-mounted device as the control target device.

15. A computer-readable recording medium containing a control program of a portable instruction terminal, said control program causing a computer to implement a method which includes:
   (i) ID information input step of inputting user ID information;
   (ii) ID judging step of judging whether or not said input user ID information is identical to pre-registered ID information which has been already registered in the portable instruction terminal;
   (iii) transmission permitting step of permitting transmission of sender authentication information to a control device which controls a control target device, if said user ID information is judged to be identical to the pre-registered ID information in said step (ii), said sender authentication information being used for allowing said control device to authorize said portable instruction terminal, wherein whether or not to permit the transmission of said sender authentication information to said control device is further decided in accordance with a request signal sent from said control device; and
   (iv) authentication information transmitting step of sending said sender authentication information to said control device, if the transmission of said sender authentication information is permitted in said step (iii),
   wherein the control device is a vehicle-mounted control device for controlling a vehicle-mounted device as the control target device.

16. A computer-readable recording medium containing a control program of a control target device, said control program causing a computer to implement a method which includes:
   (i) ID information input step of inputting user ID information to a portable instruction terminal;
   (ii) ID judging step of judging by said portable instruction terminal whether or not said input user ID information is identical to pre-registered ID information which has been already registered in the portable instruction terminal;
   (iii) transmission permitting step of permitting said portable instruction terminal to send sender authentication information to a control device which controls said control target device, if said user ID information is judged to be identical to the pre-registered ID information in said step (ii), said sender authentication information being used for allowing said control device to authorize said portable instruction terminal, wherein whether or not to permit the transmission of said sender authentication information to said control device is further decided in accordance with a request signal sent from said control device;
   (iv) authentication information transmitting step of transmitting said sender authentication information from said portable instruction terminal to said control device, if the transmission of said sender authentication information is permitted in said step (iii);
(v) authentication information receiving step of receiving at said control device said sender authentication information sent from said portable instruction terminal;
(vi) sender authenticating step of judging whether or not said received sender authentication information is identical to authentication information that is pre-registered in said control device; and
(vii) device controlling step of controlling said control target device in accordance with a judgment result in said step (vi),
wherein the control device is a vehicle-mounted control device for controlling a vehicle-mounted device as the control target device.

* * * * *

UNITED STATES PATENT AND TRADEMARK OFFICE
CERTIFICATE OF CORRECTION

| | | |
|---|---|---|
| PATENT NO. | : 7,228,122 B2 | Page 1 of 1 |
| APPLICATION NO. | : 10/486081 | |
| DATED | : June 5, 2007 | |
| INVENTOR(S) | : Masayuki Oyagi et al. | |

It is certified that error appears in the above-identified patent and that said Letters Patent is hereby corrected as shown below:

ON THE TITLE PAGE

Item (75) Inventors: Delete "Namakura" and replace it with --Nakamura--.

Signed and Sealed this

Second Day of October, 2007

JON W. DUDAS
*Director of the United States Patent and Trademark Office*